US005981065A

United States Patent [19]

Keogh et al.

[11] Patent Number: 5,981,065

[45] Date of Patent: Nov. 9, 1999

[54] TELEPHONE CABLES

[75] Inventors: Michael John Keogh; Geoffrey David Brown, both of Bridgewater, N.J.

[73] Assignee: Union Carbide Chemicals & Plastics Technology Corporation, Danbury, Conn.

[21] Appl. No.: 07/887,904

[22] Filed: May 26, 1992

[51] Int. Cl.[6] ........ B32B 1/00

[52] U.S. Cl. ........ 428/379; 428/383; 428/378; 174/113 R; 174/110 PM; 174/120 SR

[58] Field of Search ........ 428/378, 379, 428/383; 174/120 SR, 113 R, 116, 110 SR, 110 PM; 524/99, 103; 546/200, 203, 242, 244, 245, 247

[56] References Cited

U.S. PATENT DOCUMENTS

| | | | |
|---|---|---|---|
| 3,733,427 | 5/1973 | Clark et al. | 174/110 PM |
| 3,997,713 | 12/1976 | Turbett | 174/110 PM |
| 4,044,200 | 8/1977 | Turbett | 174/110 PM |
| 4,093,774 | 6/1978 | Hartless et al. | 428/379 |
| 4,097,651 | 6/1978 | Schimmel et al. | 428/379 |
| 4,233,470 | 11/1980 | Wight, Jr. | 174/110 PM |
| 4,234,656 | 11/1980 | Amembal et al. | 428/379 |
| 4,455,348 | 6/1984 | Pokorny | 428/379 |
| 4,801,749 | 1/1989 | Kazmierczak et al. | 564/158 |
| 4,824,884 | 4/1989 | MacLeay et al. | 524/99 |
| 4,857,596 | 8/1989 | MacLeay et al. | 525/142 |
| 4,857,673 | 8/1989 | Wilkus et al. | 174/110 PM |
| 4,863,999 | 9/1989 | MacLeay et al. | 525/142 |
| 4,866,136 | 9/1989 | MacLeay | 525/327 |
| 4,868,246 | 9/1989 | MacLeay et al. | 525/142 |
| 4,874,803 | 10/1989 | Baron et al. | 524/94 |
| 4,927,891 | 5/1990 | Kamath et al. | 525/327.3 |
| 4,981,917 | 1/1991 | MacLeay et al. | 525/348 |

FOREIGN PATENT DOCUMENTS

| | | |
|---|---|---|
| 1190038 | 7/1985 | Canada . |
| 434080 | 6/1991 | European Pat. Off. . |

*Primary Examiner*—William Krynski
*Assistant Examiner*—J. M. Gray
*Attorney, Agent, or Firm*—D. T. Black; P. W. Leuzzi; S. R. Bresch

[57] ABSTRACT

An article of manufacture comprising (i) a plurality of electrical conductors, each surrounded by one or more layers of a mixture comprising one or more polyolefins and the reaction product of (a) a functionalized hindered amine amic acid hydrazide and (b) a functionalized hindered phenol or a functionalized hindered amine hydrazide and (ii) hydrocarbon cable filler grease within the interstices between said surrounded conductors.

12 Claims, No Drawings

TELEPHONE CABLES

TECHNICAL FIELD

This invention relates to wire and cable and the insulation and jacketing therefor and, more particularly, to telephone cable.

BACKGROUND INFORMATION

A typical telephone cable is constructed of twisted pairs of metal conductors for signal transmission. Each conductor is insulated with a polymeric material. The desired number of transmission pairs is assembled into a circular cable core, which is protected by a cable sheath incorporating metal foil and/or armor in combination with a polymeric jacketing material. The sheathing protects the transmission core against mechanical and, to some extent, environmental damage.

Of particular interest are the grease-filled telephone cables. These cables were developed in order to minimize the risk of water penetration, which can severely upset electrical signal transmission quality. A watertight cable is provided by filling the air spaces in the cable interstices with a hydrocarbon cable filler grease. While the cable filler grease extracts a portion of the antioxidants from the insulation, the watertight cable will not exhibit premature oxidative failure as long as the cable maintains its integrity.

In the cable transmission network, however, junctions of two or more watertight cables are required and this joining is often accomplished in an outdoor enclosure known as a pedestal (an interconnection box). Inside the pedestal, the cable sheathing is removed, the cable filler grease is wiped off, and the transmission wires are interconnected. The pedestal with its now exposed insulated wires is usually subjected to a severe environment, a combination of high temperature, air, and moisture. This environment together with the depletion by extraction of those antioxidants presently used in grease-filled cable can cause the insulation in the pedestal to exhibit premature oxidative failure. In its final stage, this failure is reflected in oxidatively embrittled insulation prone to cracking and flaking together with a loss of electrical transmission performance.

To counter the depletion of antioxidants, it has been proposed to add high levels of antioxidants to the polymeric insulation. However, this not only alters the performance characteristics of the insulation, but is economically unsound in view of the high cost of antioxidants. There is a need, then, for antioxidants which will resist cable filler grease extraction to the extent necessary to prevent premature oxidative failure and ensure the 30 to 40 year service life desired by industry.

DISCLOSURE OF THE INVENTION

An object of this invention, therefore, is to provide a grease-filled cable construction containing antioxidants, which will resist extraction and be maintained at a satisfactory stabilizing level. Other objects and advantages will become apparent hereinafter.

According to the invention, an article of manufacture has been discovered which meets the above object.

The article of manufacture comprises, as a first component, a plurality of electrical conductors, each surrounded by one or more layers of a mixture comprising one or more polyolefins and the reaction product of (a) a functionalized hindered amine amic acid hydrazide and (b) a functionalized hindered phenol or a functionalized amine hydrazide and, as a second component, hydrocarbon cable filler grease within the interstices between said surrounded conductors.

In one other embodiment, the article of manufacture comprises first and second components; however, the mixture of the first component contains absorbed hydrocarbon cable filler grease or one or more of the hydrocarbon constituents thereof and, in another embodiment, the article of manufacture is comprised only of the first component wherein the mixture contains hydrocarbon cable filler grease or one or more of the hydrocarbon constituents thereof.

DESCRIPTION OF THE PREFERRED EMBODIMENTS

The polyolefins used in this invention are generally thermoplastic resins, which are crosslinkable. They can be homopolymers or copolymers produced from two or more comonomers, or a blend of two or more of these polymers, conventionally used in film, sheet, and tubing, and as jacketing and/or insulating materials in wire and cable applications. The monomers useful in the production of these homopolymers and copolymers can have 2 to 20 carbon atoms, and preferably have 2 to 12 carbon atoms. Examples of these monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene, commonly the third monomer in a terpolymer; other monomers such as styrene, p-methyl styrene, alpha-methyl styrene, p-chloro styrene, vinyl naphthalene, and similar aryl olefins; nitriles such as acrylonitrile, methacrylonitrile, and alpha-chloroacrylonitrile; vinyl methyl ketone, vinyl methyl ether, vinylidene chloride, maleic anhydride, vinyl chloride, vinylidene chloride, vinyl alcohol, tetrafluoroethylene, and chlorotrifluoroethylene; and acrylic acid, methacrylic acid, and other similar unsaturated acids.

The homopolymers and copolymers referred to can be non-halogenated, or halogenated in a conventional manner, generally with chlorine or bromine. Examples of halogenated polymers are polyvinyl chloride, polyvinylidene chloride, and polytetrafluoroethylene. The homopolymers and copolymers of ethylene and propylene are preferred, both in the non-halogenated and halogenated form. Included in this preferred group are terpolymers such as ethylene/propylene/diene monomer rubbers.

Other examples of ethylene polymers are as follows: a high pressure homopolymer of ethylene; a copolymer of ethylene and one or more alpha-olefins having 3 to 12 carbon atoms; a homopolymer or copolymer of ethylene having a hydrolyzable silane grafted to their backbones; a copolymer of ethylene and a hydrolyzable silane; or a copolymer of an alpha-olefin having 2 to 12 carbon atoms and an unsaturated ester having 4 to 20 carbon atoms, e.g., an ethylene/ethyl acrylate or vinyl acetate copolymer; an ethylene/ethyl acrylate or vinyl acetate/hydrolyzable silane terpolymer; and ethylene/ethyl acrylate or vinyl acetate copolymers having a hydrolyzable silane grafted to their backbones.

With respect to polypropylene: homopolymers and copolymers of propylene and one or more other alpha-olefins wherein the portion of the copolymer based on propylene is at least about 60 percent by weight based on the weight of the copolymer can be used to provide the polyolefin of the invention. The polypropylene can be prepared by conventional processes such as the process described in U.S. Pat. No. 4,414,132. The alpha-olefins in the copolymer are preferably those having 2 or 4 to 12 carbon atoms.

The homopolymer or copolymers can be crosslinked or cured with an organic peroxide, or to make them hydrolyzable, they can be grafted with an alkenyl trialkoxy silane in the presence of an organic peroxide which acts as a free radical generator or catalyst. Useful alkenyl trialkoxy silanes include the vinyl trialkoxy silanes such as vinyl trimethoxy silane, vinyl triethoxy silane, and vinyl triisopropoxy silane. The alkenyl and alkoxy radicals can have 1 to 30 carbon atoms and preferably have 1 to 12 carbon atoms. The hydrolyzable polymers can be moisture cured in the presence of a silanol condensation catalyst such as dibutyl tin dilaurate, dioctyl tin maleate, stannous acetate, stannous octoate, lead naphthenate, zinc octoate, iron 2-ethyl hexoate, and other metal carboxylates.

The homopolymers or copolymers of ethylene wherein ethylene is the primary comonomer and the homopolymers and copolymers of propylene wherein propylene is the primary comonomer may be referred to herein as polyethylene and polypropylene, respectively.

For each 100 parts by weight of polyolefin, the other components of the insulation mixture can be present in about the following proportions:

| | | Parts by Weight | |
|---|---|---|---|
| | Component | Broad Range | Preferred Range |
| (1) | the reaction product of (a) a hindered amine amic acid hydrazide and (b) a hindered phenol or a hindered amine hydrazide | 0.01 to 5 | 0.1 to 1 |
| (2) | hydrocarbon cable filler grease | 3 to 30 | 5 to 25 |

The mole ratio of (a) the hindered amine amic acid hydrazide to (b) the hindered phenol or hindered amine hydrazide can be in the range of about 0.1:1 to about 5:1, and is preferably in the range of about 0.5:1 to about 2:1. The reaction between components (a) and (b) can be carried out at temperatures in the range of about 50° C. to about 250° C., and is preferably carried out at temperatures in the range of about 100° C. to about 200° C.

Hydrocarbon cable filler grease is a mixture of hydrocarbon compounds, which is semisolid at use temperatures. It is known industrially as "cable filling compound". A typical requirement of cable filling compounds is that the grease has minimal leakage from the cut end of a cable at a 60° C. or higher temperature rating. Another typical requirement is that the grease resist water leakage through a short length of cut cable when water pressure is applied at one end. Among other typical requirements are cost competitiveness; minimal detrimental effect on signal transmission; minimal detrimental effect on the physical characteristics of the polymeric insulation and cable sheathing materials; thermal and oxidative stability; and cable fabrication processability.

Cable fabrication can be accomplished by heating the cable filling compound to a temperature of approximately 100° C. This liquefies the filling compound so that it can be pumped into the multiconductor cable core to fully impregnate the interstices and eliminate all air space. Alternatively, thixotropic cable filling compounds using shear induced flow can be processed at reduced temperatures in the same manner. A cross section of a typical finished grease-filled transmission core cable is made up of about 52 percent insulated wire and about 48 percent interstices in terms of the areas of the total cross section. Since the interstices are completely filled with cable core filling compound, a filled cable typically contains about 48 percent by volume of cable filling compound.

The cable filling compound or one or more of its hydrocarbon constituents enter the insulation through absorption from the interstices. Generally, the insulation absorbs about 3 to about 30 parts by weight of cable filling compound or one or more of its hydrocarbon constituents, in toto, based on 100 parts by weight of polyolefin. A typical absorption is in the range of a total of about 5 to about 25 parts by weight per 100 parts by weight of polyolefin.

It will be appreciated by those skilled in the art that the combination of resin, cable filling compound constituents, and antioxidants in the insulation is more difficult to stabilize than an insulating layer containing only resin and antioxidant, and no cable filling compound constituent.

Examples of hydrocarbon cable filler grease (cable filling compound) are petrolatum; petrolatum/polyolefin wax mixtures; oil modified thermoplastic rubber (ETPR or extended thermoplastic rubber); paraffin oil; naphthenic oil; mineral oil; the aforementioned oils thickened with a residual oil, petrolatum, or wax; polyethylene wax; mineral oil/rubber block copolymer mixture; lubricating grease; and various mixtures thereof, all of which meet industrial requirements similar to those typified above.

Generally, cable filling compounds extract insulation antioxidants and, as noted above, are absorbed into the polymeric insulation. Since each cable filling compound contains several hydrocarbons, both the absorption and the extraction behavior are preferential toward the lower molecular weight hydrocarbon wax and oil constituents. It is found that the insulation composition with its antioxidant not only has to resist extraction, but has to provide sufficient stabilization (i) to mediate against the copper conductor, which is a potential catalyst for insulation oxidative degradation; (ii) to counter the effect of residuals of chemical blowing agents present in cellular and cellular/solid (foam/skin) polymeric foamed insulation; and (iii) to counter the effect of absorbed constituents from the cable filling compound.

The functionalized hindered amine amic acid hydrazides of the invention are exemplified by the following compounds:

N-(2,2,6,6-tetramethyl-4-piperidinyl) hydrazinecarboxamide

N-(1,2,2,6,6-pentamethyl-4-piperidinyl) hydrazinecarboxamide

N-(2,2,6,6-tetramethyl-4-piperidinyl)-N'-aminosuccinamide

N-(2,2,6,6-tetramethyl-4-piperidinyl)-N'-aminomalonamide

N-(1-acetyl-2,2,6,6-tetramethyl-4-piperidinyl)-N'-aminooxamide

N,N-bis-(2,2,6,6-tetramethyl-4-piperidinyl)-N'-aminooxamide

3-[N,N-bis(2,2,6,6-tetramethyl-4-piperidinyl)amino] propionhydrazide

N-(2,2,6,6-tetramethyl-4-piperidinyl)-N-butyl-N'-aminooxamide

N-(2,2,6,6-tetramethyl-4-piperidinyl)-N'-aminooxamide.

The last compound on the above list is the preferred functionalized hindered amine amic acid hydrazide and the preferred functionalized hindered amine hydrazide.

The functionalized hindered amine hydrazides are exemplified by the above-mentioned functionalized hindered amine amic acid hydrazides and the following compounds:

2,2,6,6-tetramethyl-4-piperidinylhydrazine
1,2,2,6,6-pentamethyl-4-piperidinylhydrazine
3-(2,2,6,6-tetramethyl-4-piperidinylamino)propionhydrazide
(2,2,6,6-tetramethyl-4-piperidinylamino)acetylhydrazide
3-(1,2,2,6,6-pentamethyl-4-piperidinylamino)propionhydrazide
(2,2,6,6-tetramethyl-4-piperidinyloxy)acetyl hydrazide
(1,2,2,6,6-pentamethyl-4-piperidinyloxy)acetyl hydrazide
3-(2,2,6,6-tetramethyl-4-piperidinyloxy)propionhydrazide
3-(1,2,2,6,6-pentamethyl-4-piperidinyloxy)propionhydrazide It is noted that the functionalized hindered amine amic acid hydrazides include, among others, carboxamides, oxamides, succinamides, malonamides, and hydrazides and the functionalized hindered amine hydrazides include, among others, the foregoing and also hydrazides that do not have the amic acid group, i.e, CONH. All of the compounds must, of course, be functionalized hindered amines. Additional examples of the above can be found in European Patent Application 434,080.

Functionalized hindered phenols, useful in the invention, can be, among others, functionalized hindered phenol hydrazides, hydrazones, semicarbazides, oxamides, carbazates, or amino and amine compounds. The following are examples of the above:

2-(3,5-di-t-butyl-4-hydroxybenzyl)-2-aminopropane
2,6-di-t-butyl-4-aminophenol
2,6-di-t-amyl-4-aminophenol
2,6-di-t-hexyl-4-aminophenol
2,6-bis(1,1-dimethylpentyl)-4-aminophenol
2,6-bis(1,1,3,3-tetramethylbutyl)-4-aminophenol
2-t-butyl-6-t-amyl-4-aminophenol
2-t-butyl-6-(1,1-dimethylbutyl)-4-aminophenol
2-t-amyl-6-(1,1-dimethylbutyl)-4-aminophenol
2-t-butyl-6-(1,1-dimethylpentyl)-4-aminophenol
2-t-butyl-6-(1,1,3,3-tetramethylbutyl)-4-aminophenol
2-t-butyl-6-methyl-4-aminophenol
2-t-amyl-6-methyl-4-aminophenol
3,5-di-t-butyl-4-hydroxybenzylamine
3,5-di-t-amyl-4-hydroxybenzylamine
3,5-di-t-hexyl-4-hydroxybenzylamine
3-t-butyl-5-methyl-4-hydroxybenzylamine
2-(3,5-di-t-butyl-4-hydroxyphenyl)ethylamine
2-(3,5-di-t-amyl-4-hydroxyphenyl)ethylamine
2-(3-t-butyl-5-methyl-4-hydroxyphenyl)ethylamine
3-(3,5-di-t-butyl-4-hydroxyphenyl)propylamine
3-(3,5-di-t-amyl-4-hydroxyphenyl)propylamine
3-(3-t-butyl-5-methyl-4-hydroxyphenyl)propylamine
3-(3,5-di-t-butyl-4-hydroxyphenyl)propionhydrazide
3-(3,5-di-t-amyl-4-hydroxyphenyl)propionhydrazide
3-(3-t-butyl-5-methyl-4-hydroxyphenyl)propionhydrazide
3-(3-t-butyl-4-hydroxyphenyl)propionhydrazide
3-(3,6-di-t-hexyl-4-hydroxyphenyl)propionhydrazide
3,5-di-t-butyl-4-hydroxybenzhydrazide
3,5-di-t-amyl-4-hydroxybenzhydrazide
3-t-butyl-5-methyl-4-hydroxybenzhydrazide
3-(3,5-di-t-butyl-4-hydroxyphenyl)acrylic acid hydrazide
4-(3,5-di-t-butyl-5-hydroxyphenyl)semicarbazide
1-methyl-3-(3,5-di-t-butyl-4-hydroxyphenyl)propionhydrazide
(3,5-di-t-butyl-4-hydroxyphenyl)acetylhydrazide
N-(3,5-di-t-butyl-4-hydroxyphenyl)-N'-aminooxamide
2,5-di-t-butyl-4-hydroxyphenylcarbazate
3,5-di-t-butyl-4-hydroxybenzylcarbazate
(3,5-di-t-butyl-4-hydroxyphenylmercapto)acetylhydrazide
(3-t-butyl-5-methyl-4-hydroxyphenylmercapto)acetylhydrazide
3-(3,5-di-t-butyl-4-hydroxyphenylmercapto)propionhydrazide
3-(3-t-butyl-5-methyl-4-hydroxyphenylmercapto)propionhydrazide
(3,5-di-t-butyl-4-hydroxybenzylmercapto)acetylhydrazide
(3-t-butyl-5-methyl-4-hydroxybenzylmercapto)acetylhydrazide
3-(3,5-di-t-butyl-4-hydroxybenzylmercapto)propionhydrazide
3-(3-t-butyl-5-methyl-4-hydroxybenzylmercapto)propionhydrazide The preferred hindered phenol is 3-(3,5-di-tert-butyl-4-hydroxyphenyl)propionic hydrazide.

The reaction product of (a) functionalized hindered amine amic acid hydrazide and (b) functionalized hindered phenol or functionalized amine hydrazide can have the following generic formula:

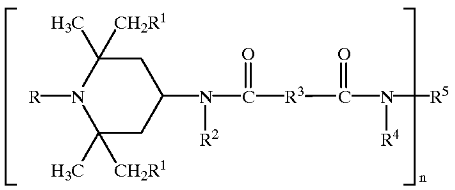

wherein R, $R^1$, $R^2$, and $R^4$ are independently hydrogen or methyl;

$R^3$ is a direct bond or an alkylene having 1 to 4 carbon atoms;

n is 1 or 2;

(i) when n is 1:

$R^5$ is $-N{=}C(R^6)(R^7)$ or $-N(R^8)Q(R^9)$;

Q is $-C({=}O)-$ or $-C({=}O)NH-$;

$R^6$ and $R^7$ are independently hydrogen; alkyl having 1 to 4 carbon atoms; or substituted or unsubstituted aryl having 6 to 14 carbon atoms or arylaliphatic having 7 to 22 carbon atoms wherein the substituents are hydroxy or alkyl having 1 to 4 carbon atoms; or are linked together through a nitrogen atom to form a 2,2,6,6-tetramethyl-4-piperidinyl ring;

$R^8$ is hydrogen or methyl;

when Q is $-C({=}O)-$:

$R^9$ is 3,5-di-tert-butyl-4-hydroxyphenyl, 2-(3,5-di-tert-butyl-4-hydroxyphenyl)ethyl, or 2,2,6,6-tetramethyl-4-piperidinyl;

when Q is $-C({=}O)NH-$:

$R^9$ is $R^{10}$ $R^{10}$ is 3,5-di-tert-butyl-4-hydroxyphenyl or 2,2,6,6-tetramethyl-4-piperidinyl; and (ii) when n is 2:

$R^5$ is $-NH-Q-R^{11}-Q-NH-$

Q is $-C({=}O)-$ or $-C({=}O)NH-$; and $R^{11}$ is alkyl or alkylene having 2 to 4 carbon atoms.

In preferred formulas based on the above:

1. n is 1; R, $R^1$, $R^2$, and $R^4$ are hydrogen; $R^3$ is a direct bond; $R^5$ is $-NH-C({=}O)-R^9$; and $R^9$ is 3,5,-di-tert-butyl-4-hydroxyphenyl or 2-(3,5-di-tert-butyl-4-hydroxyphenyl)ethyl.

2. The same as item 1, above, except that $R^5$ is $-N{=}C(R^6)(R^7)$ and $R^6$ and $R^7$ are linked together through a nitrogen atom to form a 2,2,6,6-tetramethyl-4-piperidinyl ring.

3. The same as item 2, above, except that $R^6$ is hydrogen and $R^7$ is 3,5-di-tert-butyl-4-hydroxyphenyl.

4. n is 2; $R^5$ is —NH—Q—$R^{11}$—Q—NH—; Q is —C(═O)—; and $R^{11}$ is —$CH_2CH_2$—.

The polyolefin can be one polyolefin or a blend of polyolefins. The reaction product can be one or a mixture of reaction products of anhydride and hindered phenol and/or hindered amine. The reaction product can be present in the mixture with free hindered phenol or free hindered amine and can also be used in combination with disulfides, phosphites or other non-phenolic or non-amine antioxidants in molar ratios of about 1:1 to about 1:2 for additional oxidative and thermal stability, but, of course, it must be determined to what extent these latter compounds are extracted by the grease since this could affect the efficacy of the combination.

The following conventional additives can be added in conventional amounts if desired: ultraviolet absorbers, antistatic agents, pigments, dyes, fillers, slip agents, fire retardants, stabilizers, crosslinking agents, halogen scavengers, smoke inhibitors, crosslinking boosters, processing aids, e.g., metal carboxylates, lubricants, plasticizers, viscosity control agents, and blowing agents such as azodicarbonamide. The fillers can include, among others, magnesium hydroxide and alumina trihydrate. As noted, other antioxidants and/or metal deactivators can also be used, but for these or any of the other additives, resistance to grease extraction must be considered. 1,2-bis(3,5-di-tert-butyl- 4-hydroxy-hydrocinnamoyl)hydrazine added as an adjunct metal deactivator and antioxidant is desirable.

Additional information concerning grease-filled cable can be found in Eoll, *The Aging of Filled Cable with Cellular Insulation*, International Wire & Cable Symposium Proceeding 1978, pages 156 to 170, and Mitchell et al, *Development, Characterization, and Performance of an Improved Cable Filling Compound*, International Wire & Cable Symposium Proceeding 1980, pages 15 to 25. The latter publication shows a typical cable construction on page 16 and gives additional examples of cable filling compounds.

Additional examples of various polyolefins, hindered phenols, hindered amines, and anhydrides useful in the invention can be found in U.S. Pat. Nos. 4,801,749; 4,824,884; 4,857,596; 4,863,999; 4,866,136; 4,868,246; 4,874,803; and 4,927,891; European patent application 434,080; and Canadian patent 1,190,083.

The patents, patent application, and other publications mentioned in this specification are incorporated by reference herein.

The invention is illustrated by the following examples.

EXAMPLES 1 TO 4

Preparation of the reaction product of a hindered amine amic acid hydrazide and a hindered phenol. The reaction product is 1-[N-(2,2,6,6-tetramethyl-4-piperidinyl (oxamoyl)]-2-[3-(3,5-di-tert-butyl- 4-hydroxyphenyl)-propionyl]hydrazine.

Into a 200 milliliter three-necked round bottom flask equipped with a magnetic stirrer are added 1.87 grams (0.005 mole) of (3,5-di-tert-butyl-4-hydroxyphenyl) propionic acid and 40 milliliters of toluene. After heating to 50° C., 0.90 gram (0.55 milliliters) of thionyl chloride is added via a syringe to the stirred solution, followed with 30 milliliters of methylene chloride. The solution temperature is raised to 110° C. for ½ hour with continual removal of distillate containing primarily methylene chloride, excess thionyl chloride, and hydrogen chloride and sulfur dioxide gases. The remaining solution, faint yellow in color, is then cooled to 70° C. before 1.21 grams (0.005 mole) of N-(2,2,6,6-tetramethyl-4-piperidinyl)-N'-aminooxamide dissolved in 50 milliliters of methylene chloride is slowly added during a ½ hour period. Distillate is collected to maintain a reaction temperature of 70° C. and this temperature is held for one hour after the addition. The cooled solution is filtered and the solid is washed with methylene chloride and dried for 2 hours at 75° C. in a vacuum oven. The product yield of a tan solid is 2.4 grams having a melting point of 255 to 260° C. Infrared spectroscopy and mass spectroscopy confirmed the structure assigned to the above-mentioned reaction product. This reaction product will be referred to as antioxidant A.

Polyethylene I is a copolymer of ethylene and 1-hexene. The density is 0.946 gram per cubic centimeter and the melt index is 0.9 gram per 10 minutes.

Antioxidant B is tetrakis[methylene(3,5-di-tert-butyl-4-hydroxyhydrocinnamate)]methane.

Antioxidant C is 1,2-bis(3,5-di-tert-butyl-4-hydroxy-hydrocinnamoyl)hydrazine.

A laboratory procedure simulating the grease filled cable application is used to demonstrate performance. Polyethylene I samples incorporating specified antioxidants are prepared using standard melt mixing techniques. The samples are then formed into approximately 10 mil (0.010 inch) thick test plaques using ASTM D-1928 methods as a guideline. There is a final melt mixing on a two roll mill or laboratory Brabender™ type mixer followed by preparation of the test plaques using a compression molding press at 150° C. Initial oxygen induction time is measured on these test plaques.

A supply of hydrocarbon cable filler grease is heated to about 80° C. and well mixed to ensure uniformity. A supply of 30 millimeter dram vials are then each filled to approximately 25 millimeters with the cable filler grease. These vials are then cooled to room temperature for subsequent use. An oil extended thermoplastic rubber (ETPR) type cable filler grease is the hydrocarbon cable filler grease used in these examples. It is a typical cable filling compound.

Each ten mil test plaque is then cut to provide about twenty approximately one-half inch square test specimens. Before testing, each vial is reheated to about 70° C. to allow for the easy insertion of the test specimens. The specimens are inserted into the vial one at a time together with careful wetting of all surfaces with the cable filler grease. After all of the specimens have been inserted, the vials are loosely capped and placed in a 70° C. circulating air oven. Specimens are removed after 1, 2, and 4 weeks, the surfaces are wiped dry with tissue, and the specimens are tested for OIT. After 4 weeks, the remaining specimens are removed, wiped dry, and placed in a static air chamber at 90° C. At various intervals, specimens are removed and tested for OIT.

OIT testing is accomplished in a differential scanning calorimeter with an OIT test cell. The test conditions are: uncrimped aluminum pan; no screen; heat up to 200° C. under nitrogen, followed by a switch to a 50 milliliter flow of oxygen. Oxidation induction time (OIT) is the time interval between the start of oxygen flow and the exothermic decomposition of the test specimen. OIT is reported in minutes; the greater the number of minutes, the better the OIT. OIT is used as a measure of the oxidative stability of a sample as it proceeds through the cable filler grease exposure and the oxidative aging program. Relative performance in the grease filled cable applications can be predicted by comparing initial sample OIT to OIT values after 70° C. cable filler grease exposure and 90° C. oxidative aging.

Variables and results are set forth in the following Table.

TABLE

| | (parts by weight) | | | |
|---|---|---|---|---|
| Example | 1 | 2 | 3 | 4 |
| Polyethylene I | 100.0 | 100.0 | 100.0 | 100.0 |
| Antioxidant A | — | 0.40 | 0.60 | 0.40 |
| Antioxidant B | 0.40 | — | — | — |
| Antioxidant C | 0.20 | — | — | 0.20 |
| Initial | OIT (minutes) | | | |
| (weeks) | 205 | 21 | 35 | 155 |
| 1 | 45 | 15 | 26 | 95 |
| 2 | 36 | 15 | 20 | 105 |
| 4 | 36 | 18 | 21 | 68 |
| 6 | 27 | 15 | 20 | 79 |
| 8 | 19 | 14 | 21 | 80 |
| 12 | 17 | 14 | 20 | 89 |
| 16 | 12 | 13 | 21 | 84 |
| 20 | 11 | 17 | 19 | 80 |

We claim:

1. An article of manufacture comprising (i) a plurality of electrical conductors having interstices therebetween, each electrical conductor being surrounded by one or more layers of a mixture comprising one or more polyolefins; the reaction product of (a) a functionalized hindered amine amic acid hydrazide and (b) a functionalized hindered phenol or a functionalized hindered amine hydrazide; and 1,2-bis(3,5-di-tert-butyl-4-hydroxyhydrocinnamoyl)hydrazine and (ii) hydrocarbon cable filler grease within the interstices between said surrounded conductors.

2. The article of manufacture defined in claim 1 wherein the reaction product has the following formula:

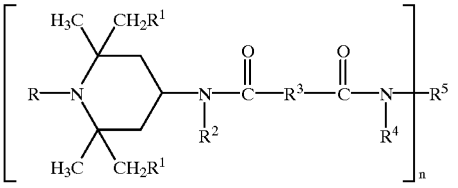

wherein $R$, $R^1$, $R^2$, and $R^4$ are independently hydrogen or methyl;

$R^3$ is a direct bond or an alkylene having 1 to 4 carbon atoms;

n is 1 or 2;

(i) when n is 1:

$R^5$ is —N═C($R^6$)($R^7$) or —N($R^8$)Q($R^9$);

Q is —C(═O)— or —C(═O)NH—;

$R^6$ and $R^7$ are independently hydrogen; alkyl having 1 to 4 carbon atoms; or substituted or unsubstituted aryl having 6 to 14 carbon atoms or arylaliphatic having 7 to 22 carbon atoms wherein the substituents are hydroxy or alkyl having 1 to 4 carbon atoms; or are linked together through a nitrogen atom to form a 2,2,6,6-tetramethyl-4-piperidinyl ring;

$R^8$ is hydrogen or methyl;

when Q is —C(═O)—:

$R^9$ is 3,5-di-tert-butyl-4-hydroxyphenyl, 2-(3,5-di-tert-butyl-4-hydroxyphenyl)ethyl, or 2,2,6,6-tetramethyl-4-piperidinyl;

when Q is —C(═O)NH—:

$R^9$ is $R^{10}$ $R^{10}$ is 3,5-di-tert-butyl-4-hydroxyphenyl or 2,2,6,6-tetramethyl-4-piperidinyl; and (ii) when n is 2:

$R^5$ is —NH—Q—$R^{11}$—Q—NH—

Q is —C(═O)— or —C(═O)NH—; and $R^{11}$ is alkyl or alkylene having 2 to 4 carbon atoms.

3. The article of manufacture defined in claim 2 wherein the polyolefin is polyethylene and/or polypropylene.

4. The article of manufacture defined in claim 2 wherein, for each 100 parts by weight of polyolefin, there are about 0.01 to about 5 parts by weight of reaction product.

5. The article of manufacture defined in claim 2 wherein the mole ratio of component (a) to component (b) is about 0.1:1 to about 5:1.

6. The article of manufacture defined in claim 2 wherein the hydrocarbon cable filler grease or one or more of the hydrocarbon constituents thereof is present in the mixture of component (i).

7. The article of manufacture defined in claim 6 wherein the amount of hydrocarbon cable filler grease or one or more of the hydrocarbon constituents thereof present in the mixture of component (i) is, in toto, in the range of about 3 to about 30 parts by weight based on 100 parts by weight of polyolefin.

8. The article of manufacture defined in claim 2 wherein, in the formula, n is 1; R, $R^1$, $R^2$, and $R^4$ are hydrogen; $R^3$ is a direct bond; $R^5$ is —NH—C(═O)—$R^9$; and $R^9$ is 3,5,-di-tert-butyl-4-hydroxyphenyl or 2-(3,5-di-tert-butyl-4-hydroxyphenyl)ethyl.

9. The article of manufacture defined in claim 2 wherein, in the formula, n is 1; R, $R^1$, $R^2$, and $R^4$ are hydrogen; $R^3$ is a direct bond; $R^5$ is —N═C($R^6$)($R^7$) and $R^6$ and $R^7$ are linked together through a nitrogen atom to form a 2,2,6,6-tetramethyl-4-piperidinyl ring.

10. The article of manufacture defined in claim 2 wherein, in the formula, n is 1; R, $R^1$, $R^2$, and $R^4$ are hydrogen; $R^3$ is a direct bond; $R^5$ is —N═CH($R^7$); and $R^7$ is 3,5-di-tert-butyl-4-hydroxyphenyl.

11. The article of manufacture defined in claim 2 wherein, in the formula, n is 2; R, $R^1$, $R^2$, and $R^4$ are hydrogen; $R^3$ is a direct bond; and $R^5$ is —NH—C(═O)—$CH_2OH_2$—C(═O)—NH—.

12. An article of manufacture comprising (i) a plurality of electrical conductors having interstices therebetween, each electrical conductor being surrounded by one or more layers of a mixture comprising polyethylene and/or polypropylene; the reaction product of (a) N-2,2,6,6-tetramethyl-4-piperidinyl)-N'-aminooxamide and (b) component (a) or 3-(3,5-di-tert-butyl-4-hydroxyphenyl)propionic hydrazide; and 1,2-bis(3,5-di-tert-butyl-4-hydroxy-hydrocinnamoyl) hydrazine and (ii) hydrocarbon cable filler grease within the interstices between said surrounded conductors, wherein, for each 100 parts by weight of said polymer, there are about 0.1 to about 1 part by weight of reaction product and the mole ratio of component (a) to component (b) is about 0.5:1 to about 2:1.

* * * * *